United States Patent [19]
Najvar et al.

[11] 3,983,167
[45] Sept. 28, 1976

[54] ACRYLATE AND METHACRYLATE MONOMERS

[75] Inventors: Daniel J. Najvar; Jerry M. Hawkins, both of Lake Jackson, Tex.

[73] Assignee: The Dow Chemical Company, Midland, Mich.

[22] Filed: May 9, 1975

[21] Appl. No.: 576,071

[52] U.S. Cl. ............................ 260/486 R; 106/20; 260/30.4 EP; 260/476 R; 526/320; 526/332
[51] Int. Cl.² ......................................... C07C 9/54
[58] Field of Search ................... 260/486 R, 476 R

[56] References Cited
OTHER PUBLICATIONS
Chemical Abstracts, vol. 52, 2894a.
Chemical Abstracts, vol. 72, 17272z.
Chemical Abstracts, vol. 73, 114987q.

*Primary Examiner*—Paul J. Killos
*Attorney, Agent, or Firm*—Albin R. Lindstrom

[57] ABSTRACT

The monomers of this invention have the formula

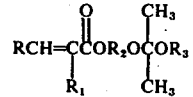

where R is H, methyl or phenyl, $R_1$ is hydrogen or methyl, $R_2$ is an alkylene radical of 2 to 4 carbons and $R_3$ is an alkyl of 1 to about 6 carbon atoms or cycloalkyl radical of 3 to about 6 carbons.

10 Claims, No Drawings

ACRYLATE AND METHACRYLATE MONOMERS

BACKGROUND

Recent government regulations affecting solvent applied systems such as inks, coatings, etc. have greatly stimulated interest and commercialization in ultraviolet light curable systems. Considerable activity has been generated in developing polymerizable coating, inks and binder resins and new monomers for these purposes.

However, certain problems and difficulties are still encountered which limit the usefulness of light curable systems. A particularly vexing problem is the de-inking of recycled paper, especially newsprint, because UV cured inks are difficult to de-ink by conventional techniques. A solution to this problem would greatly expand the market for UV cured inks. The monomers of this invention provide a solution to this problem since coatings containing the monomers disintegrate in boiling water if the acid catalyst used in preparing the monomers is not first removed or if after polymerization an acidic de-inking solution is employed.

INVENTION

Accordingly, the new monomers may be prepared by reacting hydroxyalkyl acrylates and methacrylates with an isopropenyl alkyl ether in the presence of an acid catalyst whereby the hydroxyl group is converted to a ketal group. The monomers have the formula

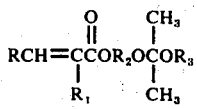

where R is hydrogen, methyl or phenyl, $R_1$ is hydrogen or methyl, $R_2$ is an alkylene radical of 2 to about 4 carbons and $R_3$ is an alkyl of 1 to about 6 carbon atoms or cycloalkyl group of 3 to about 6 carbons.

DESCRIPTION

Suitable hydroxyalkyl acrylates and methacrylates for preparing the novel monomers of this invention have the formula

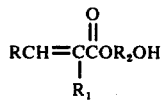

where R, $R_1$ and $R_2$ are as defined above. Preferably, R is hydrogen. $R_2$ may be ethylene, propylene, butylene and the like. Preferably, $R_2$ is a 2 or 3 carbon group derived from ethylene or propylene oxide used to prepare the hydroxyalkyl monomer initially. For use in ultraviolet (UV) curable systems, $R_1$ is preferably hydrogen.

The novel monomers are prepared by reacting the hydroxyalkyl acrylates or methacrylates with an isopropenyl alkyl ether having the formula

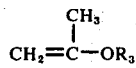

where $R_3$ is an alkyl of 1 to about 6 carbon atoms or cycloalkyl group of 3 to about 6 carbons. Reaction of this ether with the hydroxyl group produces a ketal group whereby the novel monomers have the formula

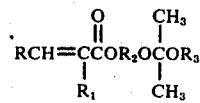

where R, $R_1$, $R_2$ and $R_3$ are as previously defined.

The reaction is highly exothermic, fast and goes to completion without the need for excess amounts of the ether. Accordingly, stoichiometric amounts of reactants are sufficient, although an excess of the ether may be used. Excess amounts are removable by distillation under vacuum. An acid catalyst is preferably employed and includes such materials as hydrochloric acid, sulfuric acid, boron trifluoride, p-toluene sulfonic acid, acid form cation exchange resins and the like. From about 0.1 to 3 weight percent of catalyst is usually sufficient. The catalyst can be removed after the reaction by means of a weak base ion exchange resin, for example. However, there is no need to remove the catalyst, and, in fact, it is preferred not to, when the monomers are to be used in a UV curable ink formulation where ease of de-inking is important or when the monomers are used to prepare coatings where water resistance is not necessary. The monomers may be used alone or in combination with other monomers or polymers which are photopolymerizable.

Because of the exothermic nature of the reaction, it is advisable to provide cooling means sufficient to moderate the exotherm and control the temperature to no more than about 100°C, preferably less. More preferably, the temperature should be controlled to about 40° to 50°C since the higher the temperature the greater the possibility that the monomer will thermally polymerize. Polymerization inhibitors may be employed to minimize this effect.

The basic reaction used to prepare the monomers of this invention has been described in U.S. Pat. No. 3,804,795 where the intent was to reduce the viscosity of polyepoxide resins and the like dissolved in various inert solvents.

Beneficially, the monomers of this invention are readily polymerized when exposed to UV light and advantageously for certain applications, exhibit reduced viscosity when combined with various binders, etc. The monomers, of course, may be polymerized in a conventional manner using free radical yielding catalysts. The monomers are suitable for formulating polymerizable inks, especially UV polymerizable inks, and may be combined with a variety of thermosettable resins such as unsaturated polyesters or vinyl ester resins.

A general procedure for making the novel monomers comprises placing a quantity of a hydroxyalkyl acrylate such as hydroxyethyl acrylate in a suitable vessel fitted with means for agitating, cooling, measuring temperature, refluxing and adding reactants. An acid catalyst, such as HCl, is then added. Methyl isopropenyl ether is then slowly added to the stirred reactor while maintaining a reactor temperature of about 40°–50°C. When at least a stoichiometric amount (mole/mole) of ether has been added, the temperature is raised to 60°–70°C to flash off excess ether. A vacuum may be applied to assist in removing the excess ether. After the reaction is completed, the contents are cooled. A polymerization inhibitor may also be added.

EXAMPLE 1

Following the above described general procedure, one mole (130 gms) of 2-hydroxypropyl acrylate and 1 gm of concentrated HCl were placed in a suitable water cooled reactor. To the mixture was slowly added 1.1 moles of methyl isopropenyl ether. The temperature was controlled below 42°C until all the ether had been added. The reactor was then heated to 50°C to flash off excess ether. Completion of the reaction was followed by infrared analysis of the -OH band.

The recovered monomer was mixed with about 3% of a photoinitiator (a benzoin butyl ether available as Trigonal 14) and coated on a steel panel (about 1 mil). The film was cured by passing the panel under three 24 inch 5,000 watt UV lamps at 40 ft./min. The coating cured completely in one pass. This rate of cure is comparable to the curing speed of hydroxypropyl acrylate.

Similar results are obtained when hydroxyethyl acrylate is used in place of hydroxypropyl acrylate. The corresponding methacrylate monomers may also be employed.

EXAMPLE 2

The monomer reaction may also be conducted in the presence of other resins or polymers which have reactive hydroxyl groups.

A half ester was prepared by reacting 1 mole of hydroxyethyl acrylate with 1 mole of phthalic anhydride. This half ester was reacted with an equivalent amount of a diglycidyl ether of bisphenol A (~1 carboxy group per each glycidyl group) to form a polymerizable resin. This resin contains hydroxyl groups as a result of the -COOH/epoxide reaction. The resin was then diluted with 35% by weight of 2-hydroxypropyl acrylate.

A portion of the above resin was then reacted with 1 mole of isopropenyl methyl ether per equivalent of hydroxyl similar to example 1. The reaction was continued at 45°C until all the hydroxyl had disappeared by infrared analysis. The resulting product had a viscosity of only 1300 cps compared to 5500 cps for the unmodified product.

A normal test used to measure coating water resistance is to immerse it in boiling water for 2 hours or for some specific period of time. Under these conditions the above coating disintegrated in less than 5 minutes. This characteristic, however, is very useful in formulating UV curable inks since it offers a method to de-ink paper. Currently, this is one problem with UV curable inks, especially for newspaper, because the ink is resistant to normal de-inking procedures in reclaiming the used newsprint paper.

What is claimed is:

1. A compound having the formula

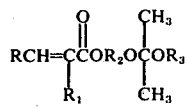

where
R is hydrogen, methyl or phenyl,
$R_1$ is hydrogen or methyl,
$R_2$ is an alkylene radical of 2 to about 4 carbons, and
$R_3$ is an alkyl of 1 to about 6 carbon atoms or cycloalkyl radical of 3 to about 6 carbons.

2. The compound of claim 1 where R is hydrogen.
3. The compound of claim 2 where $R_1$ is hydrogen.
4. The compound of claim 2 where $R_3$ is methyl.
5. The compound of claim 1 where R and $R_1$ are hydrogen and $R_3$ is methyl.
6. The compound of claim 5 where $R_2$ is ethyl.
7. The compound of claim 5 where $R_2$ is propyl.
8. The compound of claim 1 where R is hydrogen, $R_1$ is methyl and $R_3$ is methyl.
9. The compound of claim 8 where $R_1$ is ethyl.
10. The compound of claim 8 where $R_2$ is propyl.

* * * * *